(12) United States Patent
Melikian

(10) Patent No.: US 8,144,193 B2
(45) Date of Patent: Mar. 27, 2012

(54) WORK PIECE TRACKING SYSTEM AND METHOD

(75) Inventor: Simon Melikian, Westlake, OH (US)

(73) Assignee: Recognition Robotics, Inc., Westlake, OH (US)

( * ) Notice: Subject to any disclaimer, the term of this patent is extended or adjusted under 35 U.S.C. 154(b) by 625 days.

(21) Appl. No.: 12/367,967

(22) Filed: Feb. 9, 2009

(65) Prior Publication Data

US 2010/0201803 A1 Aug. 12, 2010

(51) Int. Cl.
*H04N 7/18* (2006.01)
(52) U.S. Cl. .............................. 348/90; 348/91; 348/92
(58) Field of Classification Search .................. 348/86, 348/90, 92, 91
See application file for complete search history.

(56) References Cited

U.S. PATENT DOCUMENTS

| | | | |
|---|---|---|---|
| 4,761,596 A * | 8/1988 | Nio et al. | 700/259 |
| 6,046,431 A | 4/2000 | Beattie | |
| 6,236,896 B1 | 5/2001 | Watanabe et al. | |
| 6,272,244 B1 | 8/2001 | Takahashi et al. | |
| 7,206,449 B2 | 4/2007 | Raskar et al. | |
| 7,380,697 B2 * | 6/2008 | Seki et al. | 228/102 |
| 7,570,795 B2 | 8/2009 | Yu et al. | |
| 7,623,736 B2 | 11/2009 | Viswanathan | |
| 2005/0252898 A1 | 11/2005 | Blechinger et al. | |
| 2006/0107508 A1 | 5/2006 | Bonse et al. | |
| 2007/0075048 A1 | 4/2007 | Kunisaki et al. | |
| 2007/0179918 A1 | 8/2007 | Heisele et al. | |
| 2008/0240511 A1 | 10/2008 | Ban et al. | |
| 2009/0249606 A1 * | 10/2009 | Diez et al. | 29/428 |

FOREIGN PATENT DOCUMENTS

EP 1 043 642 8/2005

OTHER PUBLICATIONS

Search Report for Application No. GB0904326.6 dated May 29, 2009.

* cited by examiner

*Primary Examiner* — Viet Vu
(74) *Attorney, Agent, or Firm* — Renner, Otto, Boisselle & Sklar, LLP

(57) ABSTRACT

A system and method of visual monitoring of a work implement (e.g., a welding torch) while a task is being performed (e.g., forming a welding joint) to train workers (e.g., apprentices, inexperienced workers) in proper welding technique, for example) and/or to evaluate the worker's use of a particular work implement (e.g., to determine if the welding torch was held in a desired relationship to the items being welded together, determine if the welding torch formed the joint at the current speed, etc.). In general, one or more cameras may acquire images of a target secured to and/or formed on the work implement. The images may be analyzed to provide feedback to the user, to be evaluated for weld integrity purposes; and/or may be used to compare the performance of a task (e.g., forming a welding joint) with a database of one or more profiles made by experienced and/or expert craftsmen.

17 Claims, 14 Drawing Sheets

A cross section of cone like structure at two different sizes (scales)

A cross section of a "steel plate" with 3 hole of difference sizes (scale) to represent a structure in an image.

Fitting Cones into holes

Showing the distance of how far the cone structure can go inside a hole (distance "d") (corresponds to correlation)

Cone-like structure at different scale

FIG. 11B
FIG. 11A
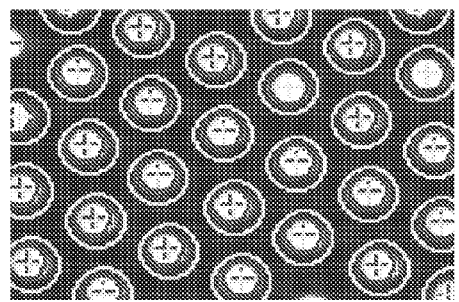
FIG. 11C
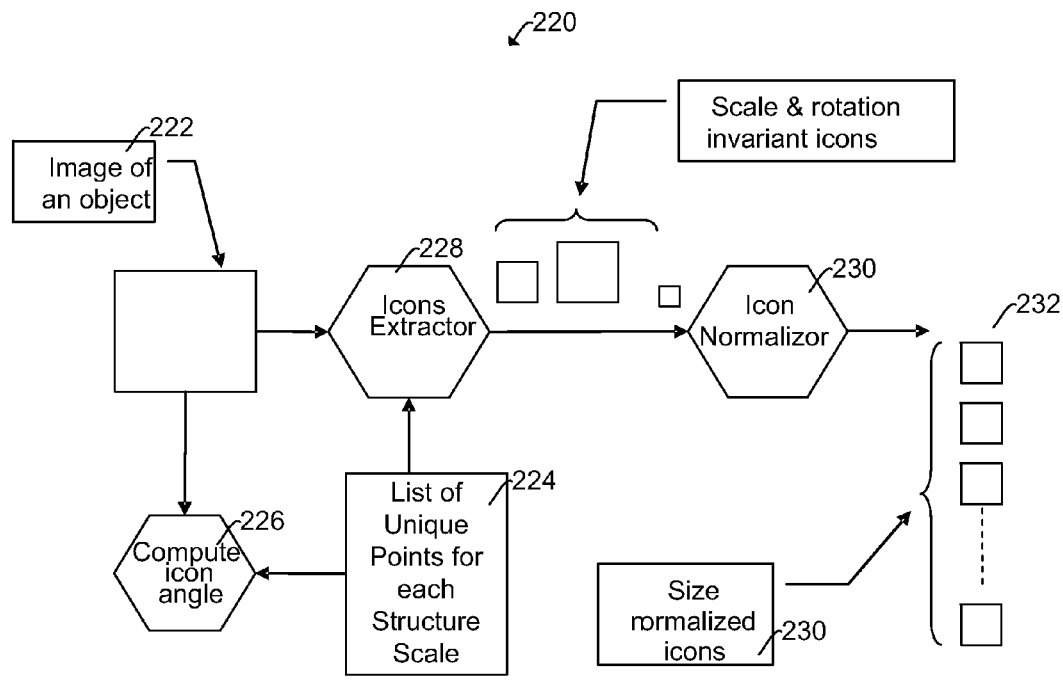
FIG. 13

WORK PIECE TRACKING SYSTEM AND METHOD

TECHNICAL FIELD OF THE INVENTION

The present invention relates to the field of work piece tracking, and more particularly, to a system and method for tracking a work piece utilizing computer vision.

DESCRIPTION OF THE RELATED ART

Many manufacturing processes require experienced craftsmen to form an article or perform a task. For example, skilled welders are extremely valuable assets to a company that makes mission critical articles that require welding. Such articles may include, for example, boat hulls, aircraft frames, buildings, etc.

It is difficult to train inexperienced welders for a variety of reasons. First, it is cost prohibitive to have an experienced welder oversee an inexperienced welder. Second, it takes a substantial amount of time, often years, to properly train a welder. Third, it is very difficult to detect errors in welds by visual observation of the weld.

SUMMARY

A strong need exists in the art for a system and method of visual monitoring of a work implement (e.g., a welding torch) while a task is being performed. Such a system and method may be used to train workers (e.g., apprentices, inexperienced workers) in proper technique. In addition, such a system and method may be used to evaluate the worker's use of a particular work implement (e.g., to determine if the welding torch was held in a desired relationship to the items being welded together, to determine if the welding torch formed the weld at a proper rate of speed, etc.). One or more cameras may be utilized to acquire images of a target placed on the work implement. The target images may be analyzed to provide feedback to the user, to be evaluated for integrity purposes (e.g., the integrity of the weld); and/or may be used to compare the performance of a task (e.g., forming a welding joint) with a database of one or more profiles made by experienced and/or expert craftsmen, for example.

Computer vision may be used to recognize objects (e.g., a target on a work implement) in an image or image sequence similar to vision in human beings. In visual recognition, achieving invariance to object presentation (position, orientation, distance (scale), and perspective), lighting, occlusion and background is challenging. Aspects of the present invention provide excellent invariance to object presentation, lighting, occlusion and background and generalization for true object recognition. Computer vision aspects of the present invention are discussed in pending U.S. patent application Ser. No. 12/101,583, and entitled "System and Method for Visual Recognition", which is incorporated herein by reference, as if fully re-written herein.

Aspects of the present invention relate to extracting unique points (e.g., x and y coordinate points) in an image of a target. Each one of these unique points has its own unique scale (e.g., size) and orientation that is related directly to the presentation of the object. Having scale and orientation information measured per unique point enables visual recognition that is fully invariant to presentation. In other words, when an object is closer, farther, rotated, tipped, and/or tilted, these unique points have similar relative locations to the object and a unique scale that is related to how close/far the object is and rotation values that are related directly to the object planar rotation. Basically these unique points "normalize the view" of the target.

An icon (image patch) from an image of a target object is extracted from each of these unique points. The size of the icon corresponds to the scale of the unique point. And the angle of the icon is the angle of the unique point. After extraction of the various icons, an object becomes a collection of icons. Each of these icons is un-rotated by icon angle and resized to a constant size so it can be compared (distance measure such as absolute difference) one-to-one with other icon (also referred to herein as "normalized"). It has been determined that the icons are virtually identical regardless of object presentation. In other words, the icons (image patches) are the same whether the object is close or far, rotated, tilted, and/or tipped. One of the unique properties of these icons is their stability over scale and angle. Comparing an icon for similarity may also include color information. Generally, when comparing two icons, each icon may also be intensity-normalized.

Searching for an object in database of learned object's (e.g., a target) images becomes a search of vectors associated with learned object's images. Indexing techniques are one way to represent an image for searching.

Computing geometric transformation between a learned object and a found object is done by computing the transformation between the corresponding learned icon's position and found icon's position, as discussed below. The transformation matrix between learned object and found object is computed using a perspective matrix using least square of all corresponding icons positions or by picking two sets of quad icons position from the learned and found objects. Based on rigid body assumptions, every set of four icons can compute a perspective matrix. Many sets of four icons give the same transformation, which provides a robust measure of correct match, also referred to herein as, measure redundancy, as discussed below.

One aspect of the present invention relates to a work implement tracking system comprising: a work implement; a target secured to the work implement; at least one camera configured to acquire one or more images of the target; and a processor coupled to the camera wherein the processor executes a vision recognition algorithm to process the acquired images of the target to determine one or more positions of the work implement during performance of a task.

Another aspect of the invention relates to a method of visual tracking of a work implement, the method including: acquiring one or more images of work implement in a view field of one or more cameras to determine one or more positions of the work implement during performance of a task, wherein the one or more images include a target disposed on the work implement; generating extremum information associated with the target by cross-correlating at least one structure across at least a portion of the image, wherein the extremum information includes at least one coordinate point associated with cross-correlating the at least one structure across the image; extracting at least one icon from the image, wherein the icon includes a coordinate point associated with the extremum information; determining an angle associated with the at least one icon; normalizing the icon to a fixed size; determining if the extracted icon from the target images matches a learned object; and storing the icon information as tool implement information in a computer readable form for a plurality of images acquired during performance of the task.

Another aspect of the invention relates to a method for tracking a learned object, the method including: acquiring periodic images of a target disposed on a work implement during performance of a task by one or more cameras; tracking the target in the images by detecting position information associated with the target as the task is performed, wherein the position information includes coordinate information and rotation information associated with the target; and storing the position information as work implement information in a storage device coupled to the one or more cameras.

Other systems, devices, methods, features, and advantages of the present invention will be or become apparent to one having ordinary skill in the art upon examination of the following drawings and detailed description. It is intended that all such additional systems, methods, features, and advantages be included within this description, be within the scope of the present invention, and be protected by the accompanying claims.

It should be emphasized that the term "comprise/comprising" when used in this specification is taken to specify the presence of stated features, integers, steps or components but does not preclude the presence or addition of one or more other features, integers, steps, components or groups thereof."

BRIEF DESCRIPTION OF THE DRAWINGS

The foregoing and other embodiments of the invention are hereinafter discussed with reference to the drawings. The components in the drawings are not necessarily to scale, emphasis instead being placed upon clearly illustrating the principles of the present invention. Likewise, elements and features depicted in one drawing may be combined with elements and features depicted in additional drawings. Moreover, in the drawings, like reference numerals designate corresponding parts throughout the several views.

FIGS. 11A-11C illustrate exemplary structures in accordance with aspects of the present invention.

FIGS. 12-16 are flow diagrams of exemplary methods in accordance with aspects of the present invention.

DETAILED DESCRIPTION OF EMBODIMENTS

The present invention is directed to a system and method of visual monitoring of a work implement (e.g., a welding torch) while a task is being performed (e.g., forming a welding joint). Such a system and method may be used to train workers (e.g., apprentices, inexperienced workers) in proper welding technique, for example. In addition, such a system and method may be used to evaluate the worker's use of a particular work implement (e.g., to determine if the welding torch was held in a desired relationship to the items being welded together, determine if the welding torch formed the joint at the current speed, etc.). While the invention will be described in terms of a welding system (e.g., metal-inert gas (MIG), tungsten-inert gas (TIG) or various other welding methods, the present invention is also applicable to any system in which it is desirable to visually monitor a work implement.

In general, one or more cameras may acquire images of a target secured to and/or formed on the work implement. The images may be analyzed to provide feedback to the user, to be evaluated for weld integrity purposes; and/or may be used to compare the performance of a task (e.g., forming a welding joint) with a database of one or more profiles made by experienced and/or expert craftsmen, for example. The images or data related to the images may also be stored in a storage device for later retrieval for review and/or comparison with one or more databases.

Figure 1:
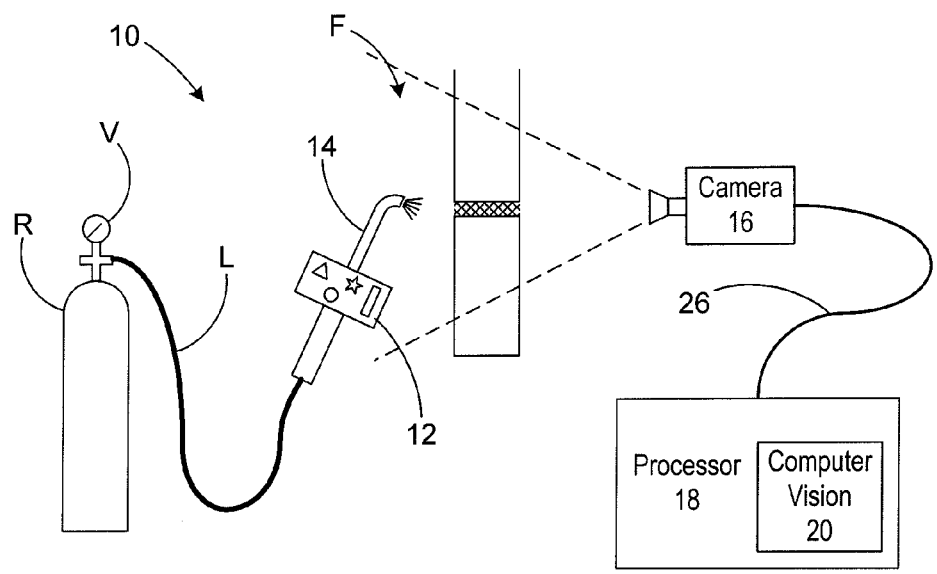
FIG. 1 is an exemplary system in accordance with aspects of the present invention.

Referring to FIG. 1, a work implement tracking system 10 is illustrated. The system includes: a target 12 secured to work implement 14, at least one camera 16 configured to acquire one or more images of the target; and a computer 18 (also referred to herein as processor 18) coupled to the camera 16. The computer 18 executes a vision recognition algorithm 20 to process the acquired images of the target to determine one or more positions of the work implement during performance of a task.

The system 10 may be used to track any type of work implement 14. The work implement 14 may be manually operated and/or controlled by a machine. The work implement 14 may any type of implement that is used to perform a task (e.g., welding torch, clamps, tools, grasping devices, etc). The work implement 14 may be one component of a system. For example, the work implement may be a welding torch, which a component of a MIG, TIG, MAG welding apparatus or other welding apparatus, for example. The welding apparatus may include a feed line (L) to a gas reservoir (R) and a control valve (V) to regulate flow of the gas to the work implement 14 (e.g., welding torch).

The target 12 may be secured to the work implement 14 in any desired manner. As used herein, the phrase "secured to" should be interpreted broadly to mean that the target 12 may be formed on the work implement, may be a label adhered to the work implement, may be an item affixed to the work implement, may be imparted into the work implement, etc.

Figure 2:
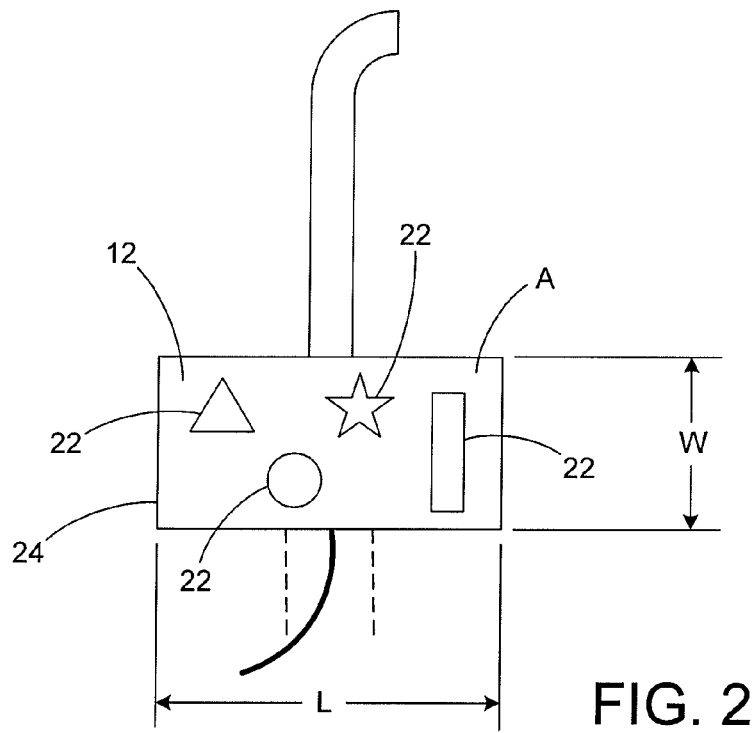
FIG. 2 is an exemplary work piece and target in accordance with aspects of the present invention.

The target 12 may have any shape, size and/or configuration. In one embodiment, the target 12 may take the form of a single shape or a plurality of shapes dispersed across a target area. Referring to FIG. 2, a target 12 having a target area (A) (defined by length (L) times width (W)) is illustrated. The target 12 includes a plurality of shapes 22 (e.g., a triangle, a rectangle, a star and a circle) dispersed across the surface of the target area (A). One of ordinary skill in the art will readily appreciate that the shapes 22 may take any desirable form, shape and/or configuration.

The target may 12 may also include a target enhancer 24. A target enhancer 24 may be in the form of an infrared source of electromagnetic radiation or another suitable mode of electromagnetic radiation to allow a camera or other device enabled with a suitable filter (e.g., an infrared filter, or filter suitably receptive to the mode of electromagnetic radiation emitted by the target enhancer 24) to track the target even in environments where it may be difficult to visibly track the target and/or work implement.

Referring back to FIG. 1, the system 10 includes at least one camera 16 having a field of view (F) (defined by dashed lines) that is capable of acquiring images of the target 12 when the target is in the field of view (F). Exemplary cameras 10 include, for example, an image sensor, a charged coupled device (CCD), a complementary metal-oxide-semiconductor (CMOS) active-pixel sensor, etc. For tasks in which movement of the target 12 and/or work implement 14 are in and out of the field of view (F) of a single camera, it may be desirable to include additional cameras positioned to view the target during performance of all or substantially of the task.

The one or more cameras 16 may be coupled to a computer 18 (also referred to herein as a processor) through a communication medium 26. The communication medium 26 can take the form of any medium that permits electronic devices to exchange information or data. For instance, the communication medium 26 may be a wired communications medium, such as Ethernet or a wireless communications medium, such as IEEE 802.11b or 802.11g. In addition, the communications medium 26 may also be a combination of wired and wireless communications mediums.

The computer 18 may be any type of processor that is capable of performing the computations described herein. For example, the computer 18 may be a general purpose computer, a lap top computer, a desktop computer, a net book, a personal digital assistant, etc.

Figure 3:
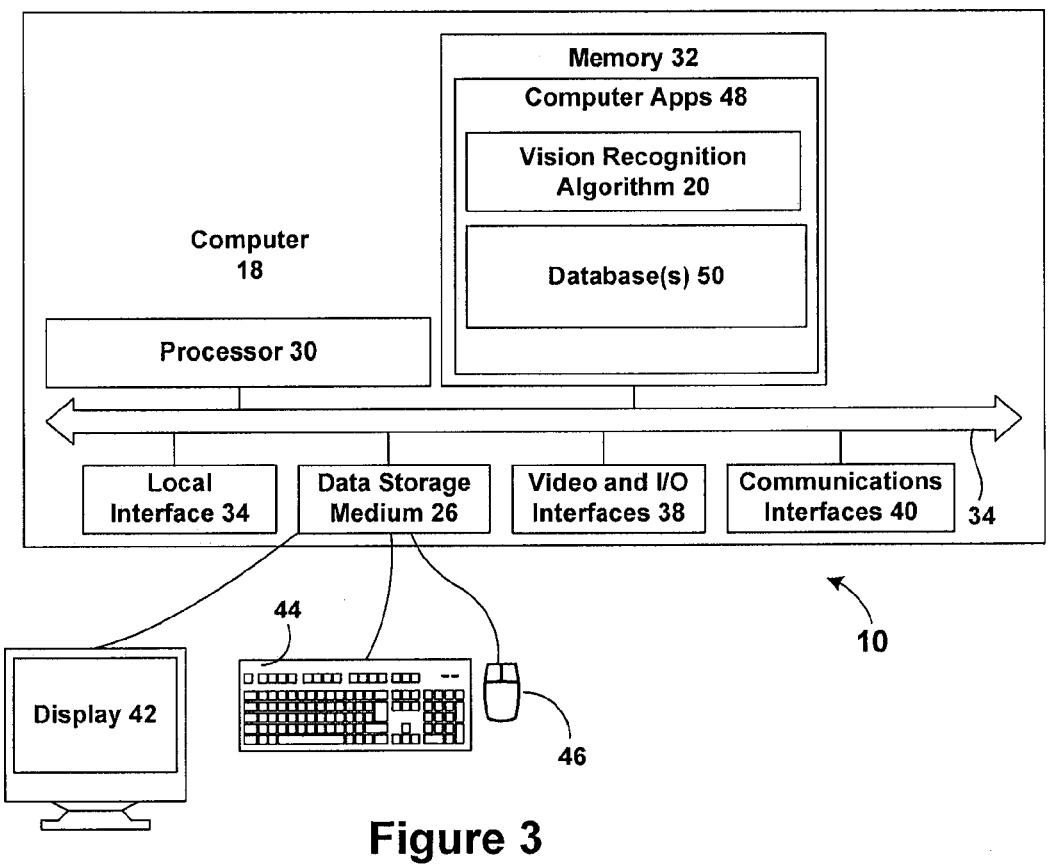
FIG. 3 is an exemplary computer system in accordance with aspects of the present invention.

FIG. 3 illustrates a schematic block diagram of the exemplary computer 18. The computer 18 generally includes a processor 30, a memory 32, a local interface 34, a data storage medium 36, video and input/output interfaces 38, and various communication interfaces 40. The computer 18 may also include a display 42, a keyboard 44, and a user input device 46 (e.g., a computer mouse, a barcode scanner, a light pen, etc.). The computer 18 may be a personal computer or other suitable processor capable of supporting local applications and/or web-based applications.

The computer 18 is generally capable of executing one or more computer application(s) 48 in accordance with aspects of the present invention. The computer applications may include vision recognition algorithm 20 and one or more data databases 50, which store information related to one or more learned targets and/or work implements. The database 50 may include one or more profiles of a task that has been completed in a proper manner. Such profiles may be used to train inexperienced persons and/or used to evaluate the performance of the inexperienced person, for example.

In one embodiment, the computer application(s) 48, vision recognition algorithm 20 and/or databases 50 may be embodied as one or more computer programs (e.g., one or more software applications including compilations of executable code). The computer program(s) can be stored on a data storage medium 36 or other computer readable medium, such as a magnetic or optical storage device (e.g., hard disk, CD-ROM, DVD-ROM, etc.).

To execute the computer application 20, 48 and associated database 50, the computer 18 can include one or more processors 30 used to execute instructions that carry out a specified logic routine(s). The computer 18 may have a memory 32 for storing data, software, logic routine instructions, computer programs, files, operating system instructions, and the like. As illustrated in FIG. 3, the computer applications 48, vision recognition algorithm 20 and database 50 can be stored in the memory 32. The memory 32 can comprise several devices and includes, for example, volatile and non-volatile memory components. Accordingly, the memory 32 can include, for example, random access memory (RAM), read only memory (ROM), hard disks, floppy disks, compact disks (e.g., CD ROM, DVD ROM, CD RW, etc.), tapes, and/or other memory components, plus associated drives and players for these memory types. The processor 30, memory 32 and the data storage medium 36 are coupled using a local interface 34. The local interface 34 can be, for example, a data bus with accompanying control bus, a network, or other subsystem.

The computer 18 may included various video and input/output interfaces 38 as well as one or more communications interfaces 40. The interfaces can be used to couple the computer 18 to various peripherals, such as a display 42 (e.g., a CRT display, a LCD display, a plasma display, etc.), a keyboard 44, and a user input device 46. The video and input/output interfaces may also couple the computer 18 to the one or more cameras 16. In addition, or alternatively, the communications interfaces 38 can be comprised of, for example, a modem, a network interface card, and/or a wireless network interface card for coupling the one or more cameras to the computer 18. The communications interfaces 38 can enable the computer 18 to receive information from the one or more cameras 16. One of ordinary skill in the art will readily appreciate that a wireless communication medium and a wired communication medium may be used interchangeably to accomplish the functionality described herein and any such arrangement shall be deemed to be within the scope of the present invention. In addition, the computer 18 may process the received images from the camera and provide feedback in real-time to the user moving the work implement 14 and/or for later retrieval and display to the user moving the implement or others (e.g., instructors, evaluators, etc.). Such feedback may be presented on a display and/or displayed on a LCD display of a welder's helmet (not shown).

As discussed above, the computer 18 executes a vision tracking algorithm 20 to determine work implement information associated with one or more of the acquired images. Work implementation information includes, for example, translation in the x, y, z co-ordinate system of the target; and rotation about the x, y, and z-axes of the target. Further work implementation information may derived from such information, e.g., rate of movement and/or acceleration associated with the work implement during performance of a task, etc., The work implementation information may be stored in the data storage medium 36. The data storage medium 36 may also store reference data (from the one or more databases 50) for comparison against the work implement information to determine whether the task was correctly performed.

Referring to FIGS. 4A-4D, an exemplary method 100 of extracting unique and highly stable points (e.g., x and y coordinate points) is illustrated. These points are highly stable in position, scale, and angle. Accordingly, such points are referred to herein as scale rotation invariant (SRI) points (and/or SRIP). One way of extracting the SRI points is by cross correlating the object image by a structure 102. Cross-correlation is generally a measure of the similarity of two signals. Cross-correlation is commonly used to find features in an unknown signal by comparing it to a known one. It is a function of the relative time between the signals and is sometimes called the sliding dot product.

Figure 4A:
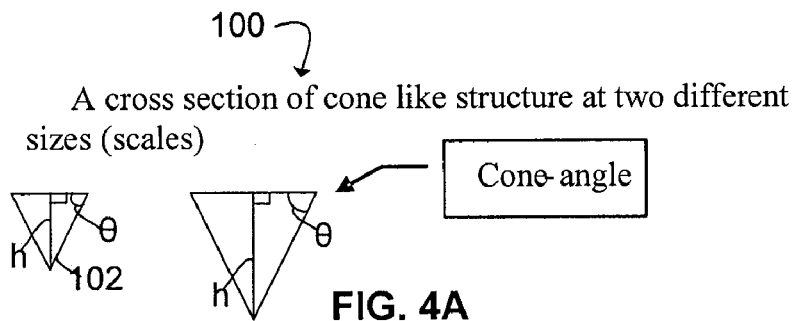
FIGS. 4A-4D are exemplary illustrations of a structure and correlation method in accordance with aspects of the present invention.

Structure 102 may be circular, conic or Gaussian shape. In one embodiment, the structure 102 is a cone-like structure. Referring to FIG. 4A, the cone-like structure 102 is illustrated in two dimensions.

The cone-like structure 102 has a cone angle θ that generally corresponds to the height (h) of the structure 102. For example, SRI points generally have very interesting properties that aid in recognition. Based on correlation score between cone-like structure (or any other desired structure) and the image: a correlation score close to 1.0 identifies round structures; a correlation score of about 0.5 identifies strip like structures; and a correlation score of about 0.7 identifies an end of strip like structure. One of ordinary skill in the art will readily appreciate that the shape of the structure chosen may correspond to a change in correlation score for the identified structure.

Figure 4B:
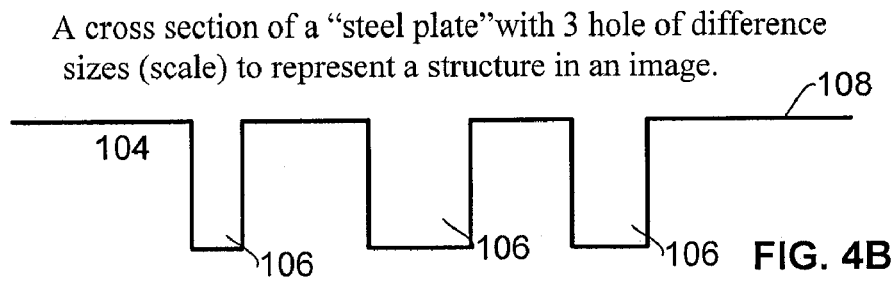

Referring to FIG. 4B, a "steel plate" 104 is illustrated. The steel plate 104 has holes 106 of varying sizes along a surface 108. The steel plate is analogous to the object image or scene image.

Figure 4C:
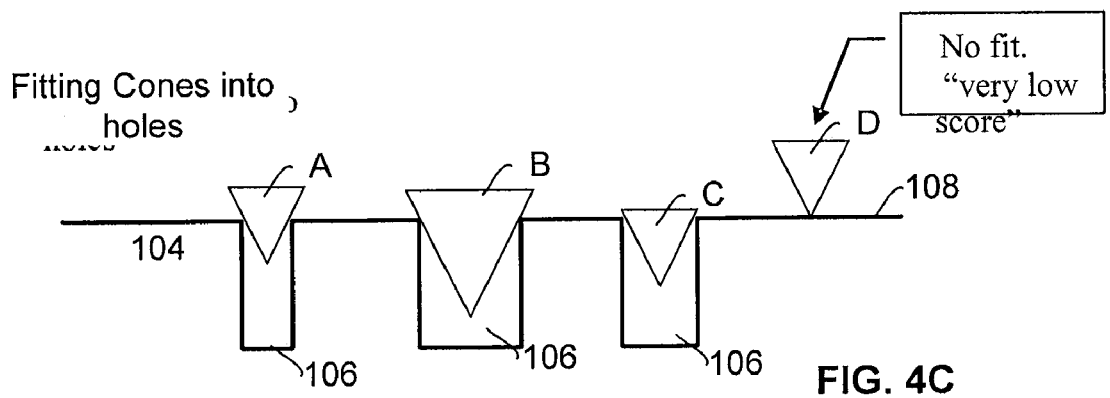

The structure 102 is attempted to be "inserted" into the steel plate 104 in a scanned manner (e.g., one pixel after another pixel). As shown in FIG. 1C, the cone-like structure 102 is illustrated being inserted into a "steel plate" 104, for purposes of illustration. One goal is to find holes (or other meaningful structure) by poking (in a scanned way) (i.e., pixel by pixel and/or group of pixels by group of pixels) the structure 102 (e.g., a cone-shape pin) into the steel plate. The structure 102 (e.g., the cone-like shape is the known cross-correlation image) is used to generate the unique points. If a point on the surface 108 does not contain a hole, the pin does not go into the steel plate 104, which yields a low score correlation match (e.g., see "D" in FIG. 4C). Referring to FIG. 4C, if structure 102 is inserted (or poked) into a hole, the cone would go in some distance depending on the pin conic size and hole size in the plate. For example at "A", the structure 102 extends into the hole 106 approximately half-way. At "C", the structure 102, which is substantially the same size as the structure at "A", extends almost fully into the hole. Accordingly, "C" has a higher correlation than "A". Also, note that at "B", a larger structure 102 than was used at "A" and "C" is illustrated. The larger structure extends approximately 80% into the hole 106, at "B". If the same sized structure used at "A" and "C" were inserted into the hole at "B", the structure would hit the bottom without touching any of the walls associated with the hole 106 and, therefore, not have a strong correlation, no extremum. In one embodiment, it is desirable to cross-correlate an image with structures having a variety of scales in order to identify all or at least a portion of the extremum information available on the image.

Figure 4D:
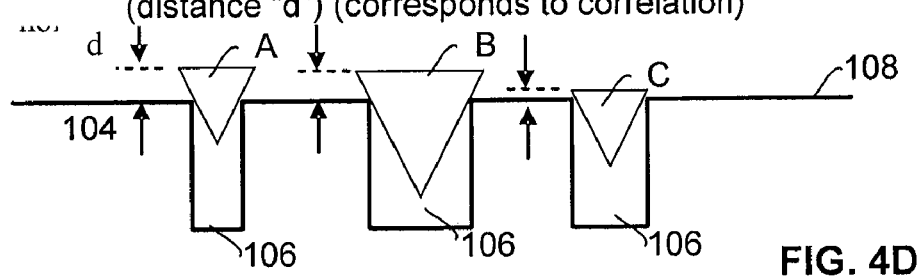

Referring to FIG. 4D, the amount that the cone goes inside (e.g., correlation match score) is related to the structure, cone-angle, and the size of the hole, or the structure. For example, this can be view as a two dimensional frequency analysis of an image. The result of cross correlating a cone structure with the image at a different scale is a set of coordinate points (x, y) and unique radius (scale) for each of these points. The radius value is directly related to the scale of the image and to the size of the structure around the coordinate point.

Figure 5:
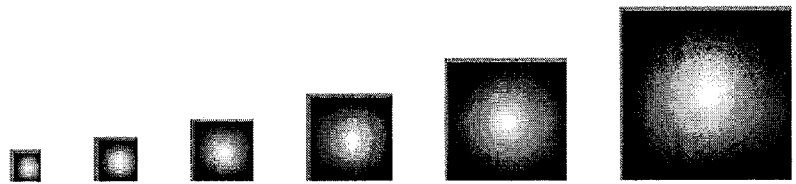
FIG. 5 is an exemplary illustration of a structure having various scales in accordance with aspect of the present invention.

FIG. 5 illustrates the cone-like structure 102 in a two-dimensional image for six different scales. The scale size may be any desirable size for each of the various structures used to identify the SRI points. The SRI points for each of the various structure sizes will generally vary when cross-correlated with an image. The collection of SRI points for all of the structure sizes is generally used to define the object, as discussed below. For example, the scale size of the structure 102 may vary from a point contact (e.g., 5×5 pixels) to the size of the image and/or object of interest. The gradations in color change correspond to the height of the cone-like structure 102

FIGS. 6A-6G illustrate an exemplary target image that has been cross-correlated with a structure 12 of varying cone size (scale) (e.g., cone-like structures illustrated in FIGS. 4 and 5). The exemplary image may be any digital image, a portion of an object or image, an electronic representation of an image, etc. As shown, in FIGS. 6A-6G, the image is a digital image of an object. It may be desirable for a machine to determine the precise location and/or orientation of target in this scene. This information may be used in any desirable manner. For example, the information may be used so that a controller, a device, or other electronic device may properly interact with software that is capable of detecting optical objects in order to facilitate controlling, locating, recording, assembling and/or processing information related to the item.

Once the image has been cross-correlated, a resulting set of unique points (also referred to herein as x and y coordinate points) and radius values (scale) for each of the points are obtained, as is illustrated by the white circles in each of the images. As stated above, any structure 102 may be used in accordance with aspects of the present invention. For example, a two dimensional Gaussian provided similar results as the cone-like structure. The cone-like structure 102 is utilized to find extremum in the object regardless of scale. This provides robust and reliable relative localization (e.g., x and y coordinate positions in the image), and scale.

Figure 6A:
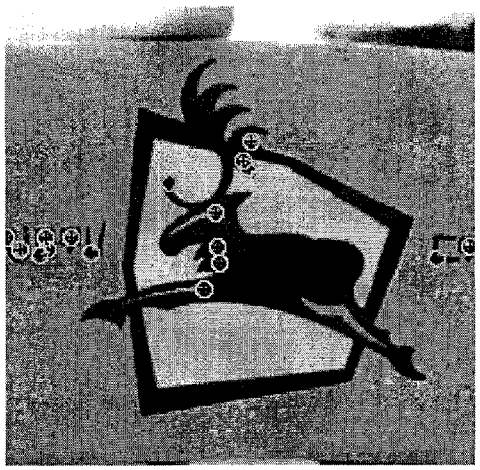
FIGS. 6A-6N illustrate correlation results and corresponding extremum information associated therewith in accordance with aspects of the present invention.
Figure 6H:
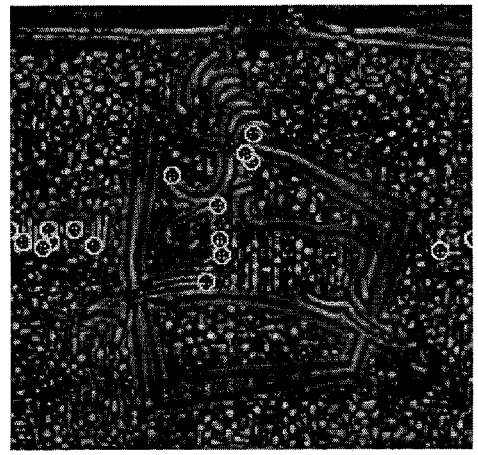
Figure 6B:
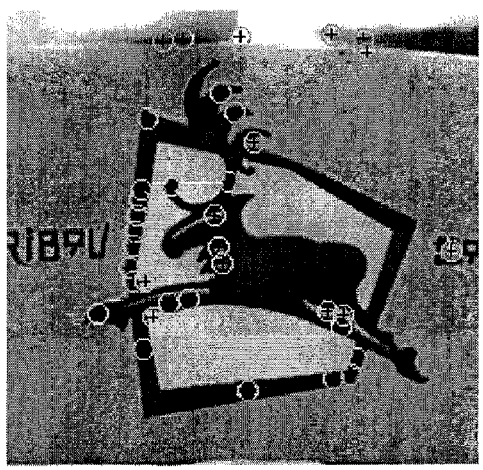
Figure 6I:
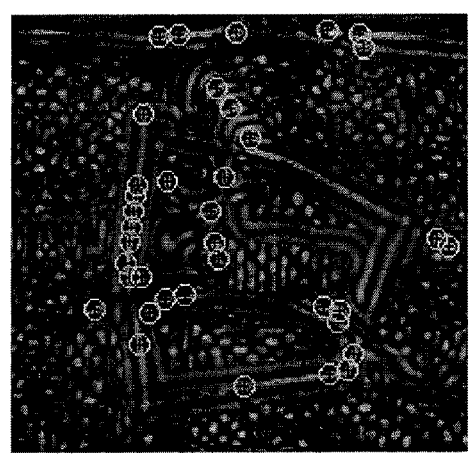
Figure 6C:
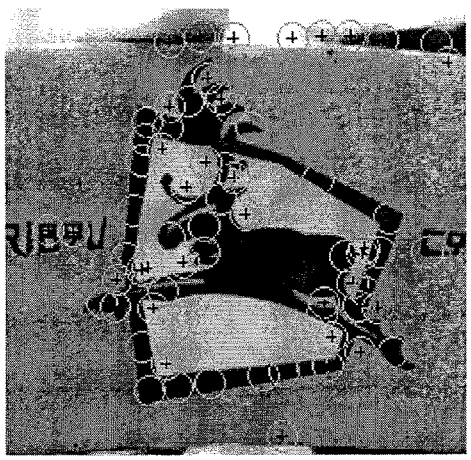
Figure 6J:
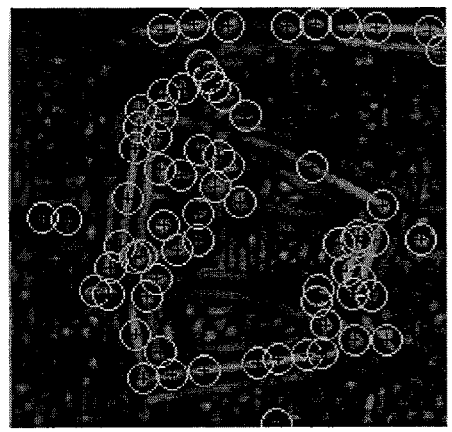
Figure 6D:
Figure 6K:
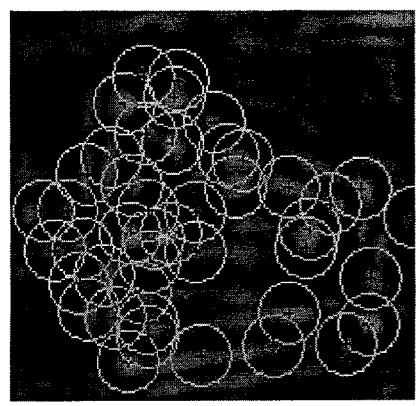
Figure 6E:
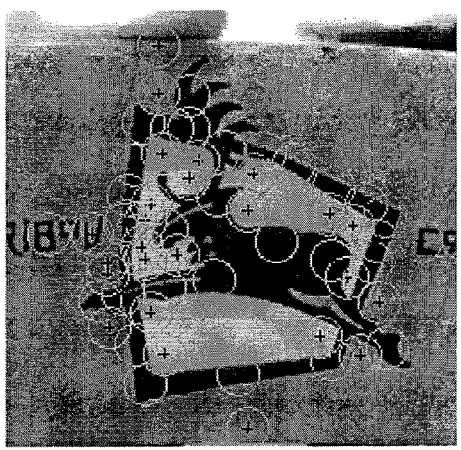
Figure 6L:
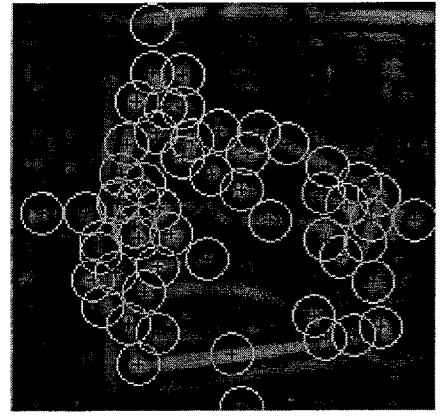
Figure 6F:
Figure 6M:
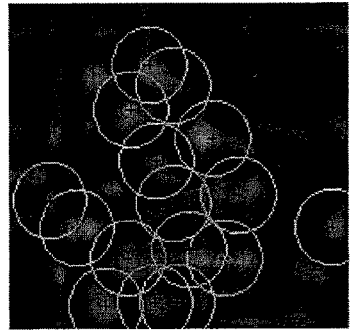
Figure 6G:
Figure 6N:
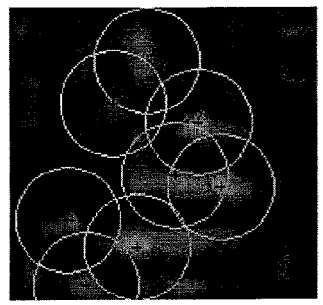

Once the correlation image is computed a peak detector is applied to find the coordinate of peaks in sub pixel form, as illustrated in FIGS. 6H-6N. FIG. 6H identifies the extremum corresponding to FIG. 6A; FIG. 6I identifies the extremum corresponding to FIG. 6B; FIG. 6J identifies the extremum corresponding to FIG. 6C; FIG. 6K identifies the extremum corresponding to FIG. 6E; FIG. 6L identifies the extremum corresponding to FIG. 6D; FIG. 6M identifies the extremum corresponding to FIG. 6F; and FIG. 6N identifies the extremum corresponding to FIG. 6G. The cone-like structure 102 is a rotational invariant extremum detector for range of scales. In addition, the cone-like structure 102 also offers superior position localization regardless of scale.

Figure 7A:
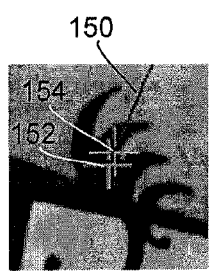
FIGS. 7A and 7B illustrate icon angle vectors in accordance with aspects of the present invention.
Figure 7B:
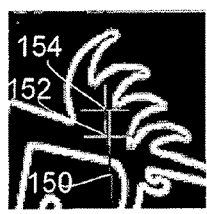

Once the unique points (e.g., coordinate values) are determined, an icon (image patch) is extracted from the associated at each of these coordinates. The icon size is proportional to the radius (scale) of the cone structure having a high cross-correlation match value. The angle of the icon 150 is computed from a vector between the unique point position 154 and the grayscale centroid position 152 of the icon at scale, as shown in FIGS. 7A and 7B. As shown in FIG. 7A, icon angle computation is based on the gray scale centroid using the raw image of the icon, for example. Icon angle computation may also be based on the edge detected image of the icon, as shown in FIG. 7B. The angle of the icon is the vector from the center of icon to the grayscale centroid. The grayscale centroid can also be applied on the raw image (e.g., such as Sobel or Canny edge detection).

Figure 8:
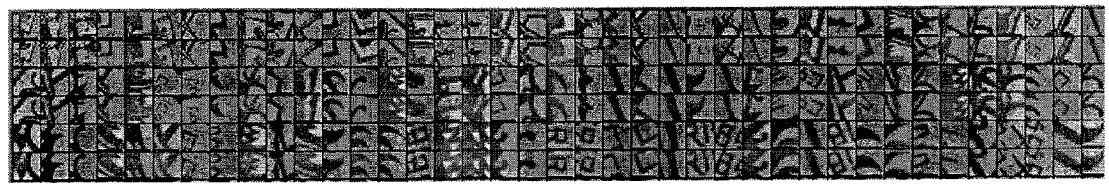
FIG. 8 is an exemplary illustration of normalized icons obtained in accordance with aspects of the present invention.
Figure 9A:
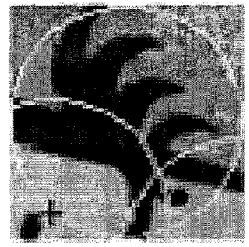
FIGS. 9A and 9B illustrate exemplary icons in accordance with aspects of the present invention.
Figure 9B:
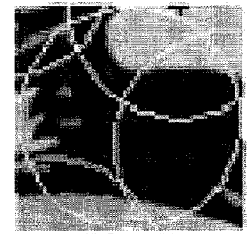

Once extracted, each one of the icons is normalized to a fixed size, as shown in FIG. 8. FIG. 8 illustrates the set of icons extracted from the image at each coordinate point for each scale associated with the structure. For example, FIG. 8 illustrates a matrix of normalized icons. The purpose of normalizing these icons into constant size is to be able to compare them with other icons (for the purpose of finding similar icons in database of icons, thus similar objects), by simply computing the difference between the two images as in the "golden template matching". Another method to compare these icons is by creating descriptor vector and then comparing these descriptors using distance measure between vectors. For example, the icon of FIG. 9A may be described in descriptor vector format as: 6,17,22,23,16,0,0,11,3,26,25,3,0,0,20, 20,6,5,4,10,5,60,0,7,6,14,4,12,9,22,12,16. Likewise, the icon of FIG. 9B may be described in descriptor vector format as:
13,7,21,11,4,5,24,11,0,58,38,0,0,0,2,0,0,5,20,11,4,28,28,1,7,6,0,0,0,84,1,0.

One of ordinary skill in the art will readily appreciate that there are many ways to compute icon descriptors (e.g., histogram of gradient angle, principle component analyses (PCA), etc.).

Figure 10A:
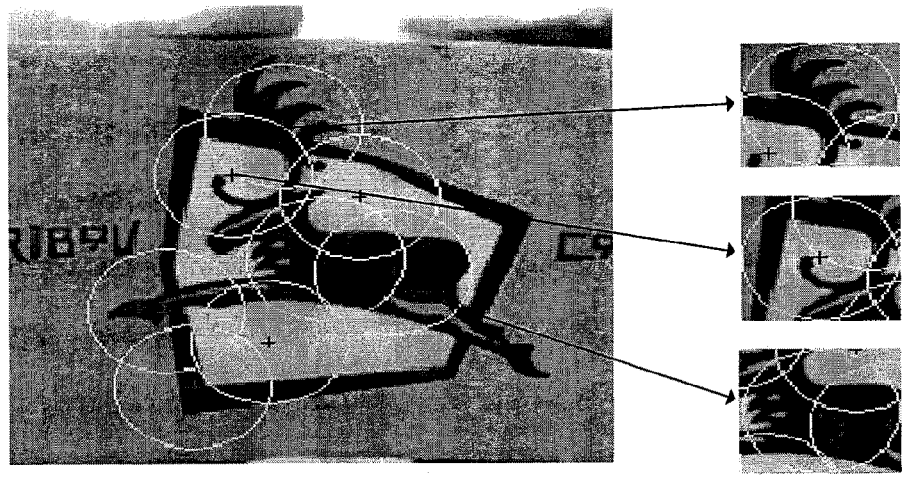
FIGS. 10A-10C illustrate exemplary icons excerpted from a target image in accordance with aspects of the present invention.
Figure 10B:
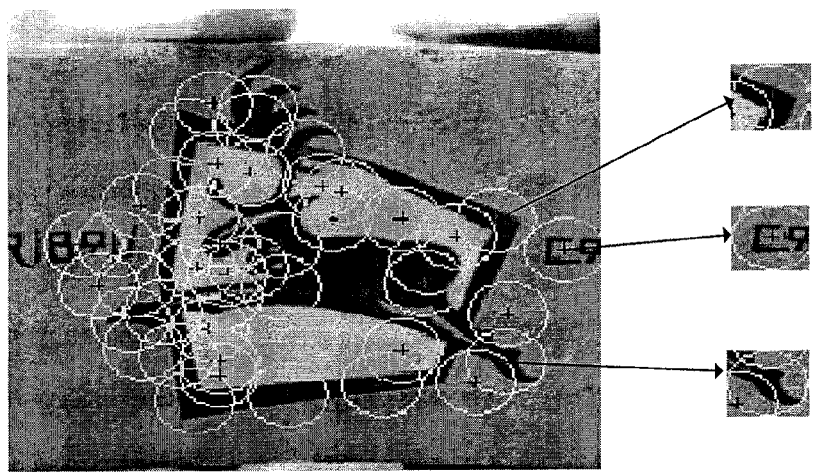
Figure 10C:
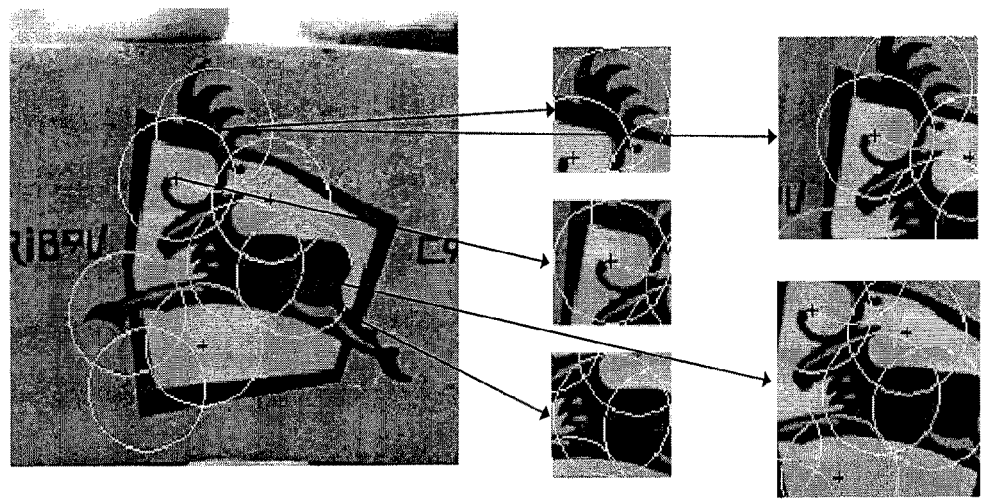

Each learned object may be described by a set of icons. Each icon generally includes one or more values, for example: (x, y) coordinate position, a size that correspond to the size of the image structure from which the icon originated from, and an angle. For example, FIGS. 10A-10C illustrates various icons extracted from a correlation of structures having various sizes. The spatial relation of these icons is insured by the outline of the object. These icons may be stored in any electronic storage device. For example, the icons may be stored in a database of icons that generally includes an identifier, which is tagged and/or otherwise associated to a specific learned object. In another embodiment, a descriptor associated with each of the icons is stored in a database or other suitable data storage medium. In another embodiment, icons may also be extracted at multiple-scale values that produce multiple icons per unique points, as opposed to extracting icons only at the cone-structure-scale. For example, if the cone-structure scale is 32×32 pixels, then extract icons at 32×32 pixels and 48×48 pixels, as illustrated in FIG. 10C. This method generally guarantees true correspondence and recognition from a very few number of icons. In fact, in many situations only one unique icon may be needed to determine recognition of the object.

FIGS. 11A-11C illustrate one process of extracting unique points from an image. In FIG. 11A, unique points are extracted along a strip like region with correlation score of about 0.5. FIG. 11B illustrates the end of a strip and has a correlation score of about 0.7. FIG. 11C illustrates many round objects being extracted. The correlation score with the round objects is approximately 1, indicating that the round objects highly correlate with the structure (e.g., the cone-like structure) selected for cross-correlating.

Figure 12:
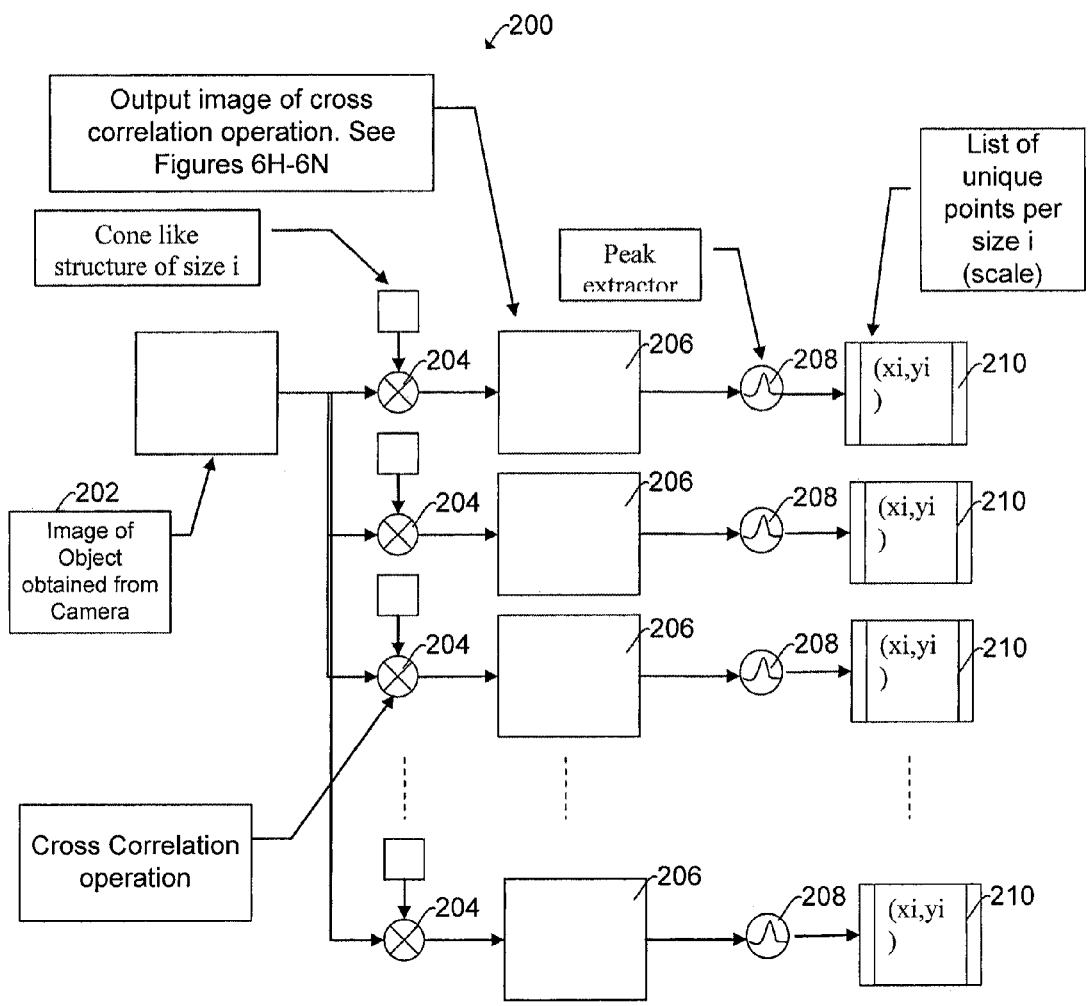

FIG. 12 illustrates one exemplary method 200 for extracting scale and rotation invariant icons from an image. At block 202, an image of an object is provided in electronic form from one or more cameras 16. The image may be in any suitable electronic format (e.g. JPEG, TIFF, PDF, bitmap, etc.) At block 204, the image of an object is cross-correlated with one or more structures 102 (e.g., cone-like structures), as described above. At block 206, output image of cross-correlation operation is obtained for each of the cross-correlation structures. At block 208, peak values are extracted for each of the cross-correlation structures. At block 210, a list of coordinate points per cross-correlation structure is obtained and stored in a memory.

FIG. 13 illustrates one exemplary method 220 for extracting scale and rotation invariant icons from an image. At block 222, an image of an object is provided in electronic form. At block 224, the list of coordinate point per cross-correlation structure is provided. At block 226, the icon angle is generated for each of the icons and stored appropriately for later use at block 228. At block 230, the icons are then normalized by appropriate scaling, as desired. At block 232, the icons are stored in a memory or other electronic storage device.

Figure 14:
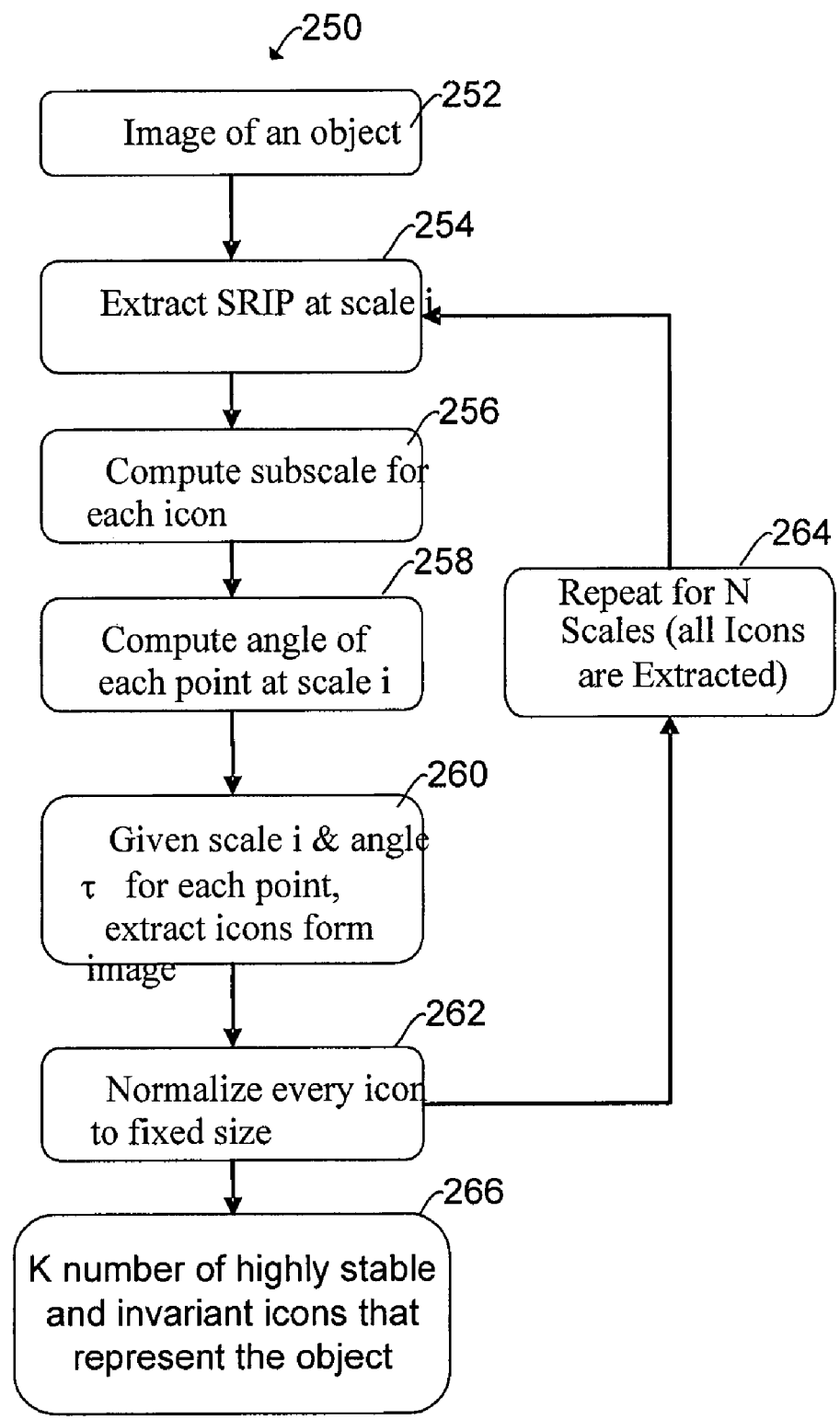

FIG. 14 illustrates another exemplary method 250 for extracting scale and rotation invariant icons from an image. At block 252, an image of an object is provided in electronic form. At block 254, scale rotation invariant points are extracted at a scale. At block 256, a subscale is computed for each icon. An extremum point is usually a peak at a scale and neighboring scales. Therefore, it is possible to compute subscale by taking the peak value at "best scale" and its neighboring scale. The scale of an icon becomes the scale of the cone-like structure plus or minus subscale. A well known method is parabola fit to find its peak in sub-position.

At block 258, the icon for each of the coordinates is computed for the scale. At block 260, given the icon angle and scale for each of the coordinates, extract icons from the image. At block 262, the icons are normalized to a fixed size. At block 264, blocks 254 through 260 are repeated until all icons have been extracted. At block 266, a constant (K) of highly stable and invariant icons that represent the object are obtained and may be stored in a memory or other suitable storage device or pumped into an indexing data base or hash table.

Figure 15:
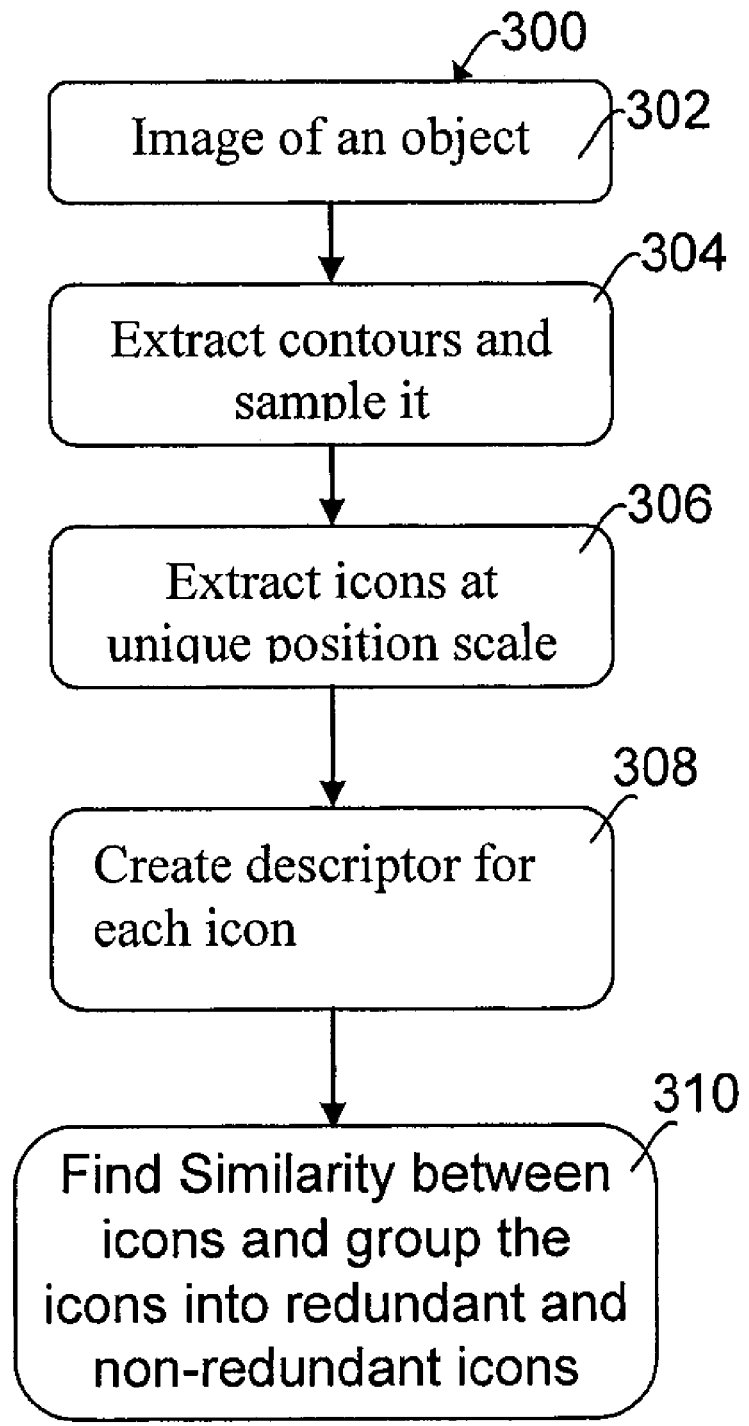

An exemplary method 300 for learning an object is illustrated in FIG. 15. At block 302, an image of an object is provided in electronic form. At block 304, an object contour point is extracted from an image of and sampled. The contours points may be used for hypotheses verification and to verify spatial relation between coordinates of unique points. In general, the unique points drive the attention and contour points verify the hypotheses. Sample points from the contour points are selected, which provides a fast verification process.

At block 306, SRI points acquired from the image and/or object to be learned are used to extract icons associated with the SRI points. In one embodiment, each icon has its (x, y) coordinate, size (scale) and angle. At block 308, a descriptor for each icon is created. In addition or in the alternative, each icon may also be tagged or otherwise associated with a learned object name.

At block 310, similar icons are found and tagged. Similar icons are generally suitable for recognition, but not unique enough for locating the object unless the spatial relation between the icons is applied such as, for example, nearest neighbor icon; n nearest neighbors; left, top, bottom, left neighbor; etc. Similar icons may have multiple correspondences. Blocks 302-310 are repeated for every object needed to be learned. Once learned, an object becomes a collection of icons (or their descriptors) and the spatial relation that ties the icons together is a set of object contour points. The icon coordinates also can be used for detecting, determining and/or verifying special relationships between the icons.

Using descriptors provides a variety of advantages. Such advantages include, for example, permitting the use of indexing techniques for fast retrieval of similar icons in a database of icons, which hastens retrieval of similar objects. This functionality is highly desirable when recognizing an object(s) from a large database of objects.

Figure 16:
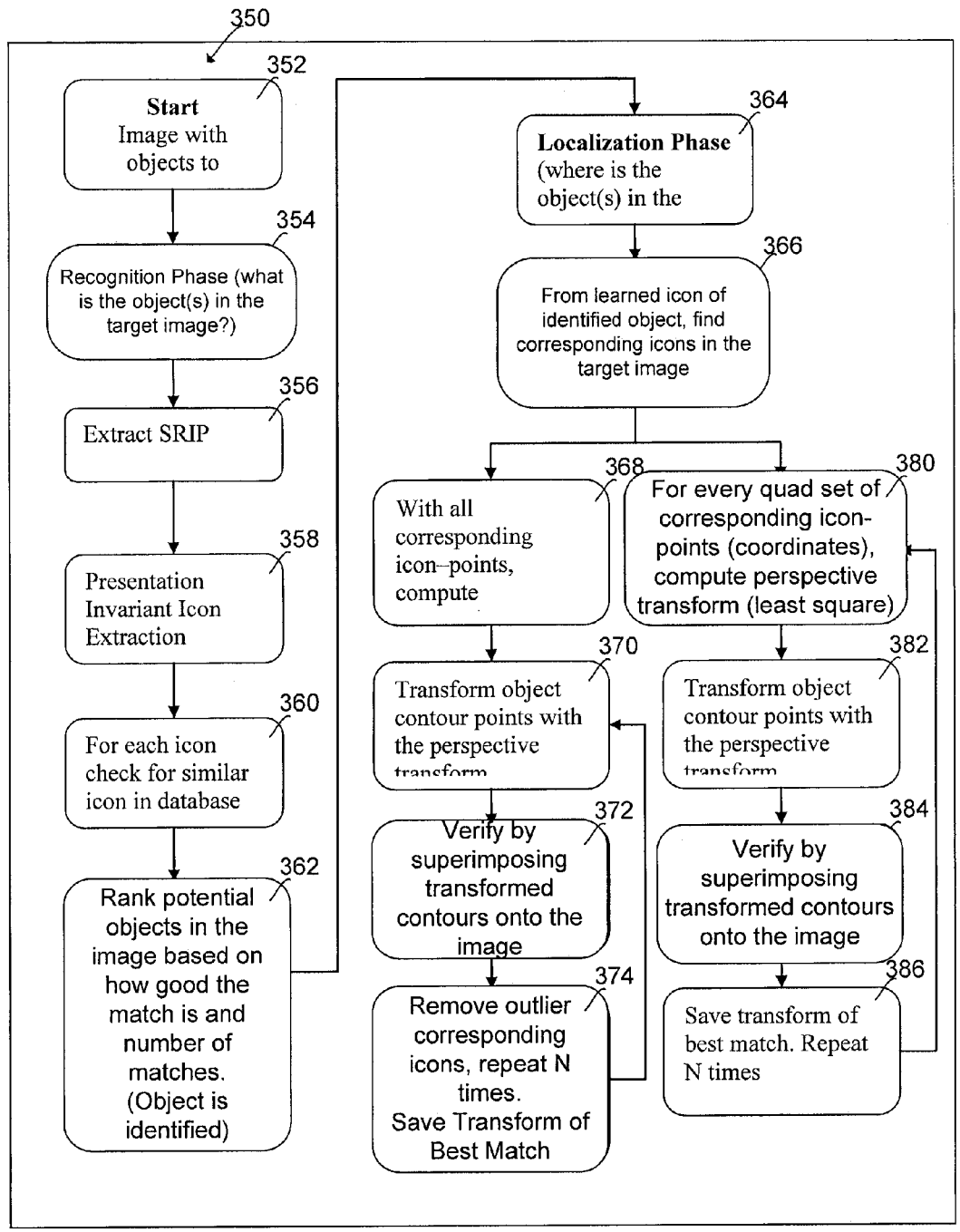

During the recognition phase, an object or multiple objects may exist in an image (scene image) and one goal is to recognize the object or multiple objects and provide the x and y coordinates of each object. An exemplary recognition method 350 is illustrated in FIG. 16. At block 352, an image having one or more objects to identify is provided in electronic form. At block 354, the recognition phase is initialized. At block 356, contour points are extracted from the image and SRI points are extracted from the image. At block 358, icons of the image are extracted at each of the unique points and normalized, as set described above. At block 360, for each extracted icon, a best matched icon is found or otherwise searched for in a database of icons using either a sequential method if number of learned object is small or an indexing method if the number of learned object is large.

At block 362, candidate objects in the image are identified and ranked based on the quality of the match and/or the number of matches. At block 364, the location of the object or objects is determined. At block 366, based on the learned icon or icons of an identified object or objects, corresponding icons in the recognized icons are found. This may be accomplished by a variety of methods.

One exemplary method begins at block 368. At block 368, all corresponding icons are used to compute a perspective transformation. This may be done by generating one or more hypotheses. The hypotheses may be generated in any desired manner. For example, all icons of learned object(s) may be selected, and compared with corresponding matched icons. Using a least square method correlation method or another correlation method, a perspective transform is generated between the learned unique point's coordinates and the corresponding matched points in the scene image. A least squares correlation method is generally preferred because there may be some outliers, at this juncture.

At block 370, the sampled learned contour points of candidate objects are transformed and superimposed on the scene image for verification. A match score between sampled contour and scene contour is computed. The transformation having the best contour match is selected. At block 372, using the transformation of the best match, all unique points of the learned object are transformed with the perspective transform onto the image. In addition, the distance between these transformed points and scene object unique points are computed. At block 374, any outlier corresponding icons are removed and the transform having the best match is saved for later use. Blocks 370 through 374 are repeated N times, where N is the number of corresponding icon points. Once this method has been applied N times, the transform having the best match is saved for later use.

Another method for obtaining precise localization of an icon is illustrated in blocks 380-386. Referring to block 380, for every quad set of corresponding icons points (e.g., coordinates), a perspective transform is computed using least squares or some other correlation method. At block 382, the object contour points with the perspective transform is transformed, in similar manner as block 370. At block 384, transformed contour points are transformed and superimposed onto the image to verify the transform, as discussed above with respect to block 372. At block 386, the transform producing the best match is saved and the process repeats N times (where N is the number of quad sets).

Figure 17A:
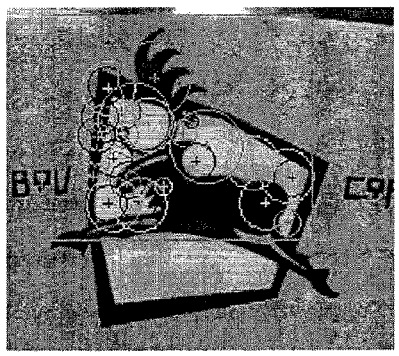
FIGS. 17A-17B illustrate samples of unique points from a target that are invariant to presentation.
Figure 17B:
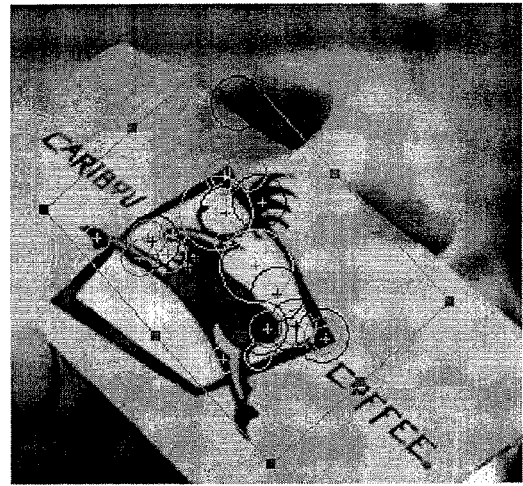

FIGS. 17A and 17B illustrate samples of unique points that are invariant to presentation. For example, FIG. 17A illustrates an object in an image, wherein the image was taken at a relatively close distance to the object and/or the image has been zoomed in around the object. FIG. 17B illustrates an image of the same object taken at a further distance and/or zoomed further out, and rotated, tipped and tilted than the image in FIG. 17A. One of ordinary skill in the art will readily appreciate that the images illustrated in FIGS. 17A and 17B are exemplary in nature and that the target 12 associated with the work implement 14 may also be a suitable target image.

In operation, a method of generating the hypotheses picks a predetermined number of points (e.g., four points) of the leaned unique points and a predetermined number of corresponding points (e.g., four points) in the scene image. The process is repeated for N number of quad points. For every set of four points the perceptive transform is generated and sampled contour points are transformed and superimposed on the scene contour points. The transform of highest match between learned contours and scene contour is kept as the best transformation transform. For a set of ten matching icons between learned object and found object, there are 210 possible combination and, of course, 210 possible hypotheses generation and verifications. The speed of the recognition process (the entire process) for one learned object is about 140 millisecond using standard off the shelf Pentium based processor with 1.6 GHz processor speed. It is approximately 2 milliseconds extra for every learned object using sequential icon matching. This means, for example, that for 430 learned objects, a recognition would take 1 second ((1000−140)/2). A hash table based indexing would have the potential of achieving recognition of a million objects in one second.

As a practical contribution, the aspects of the present invention may be used in a wide variety of application including, for example, Exemplary computer vision applications include: visual object recognition and scene interpretation, particularly for image retrieval, video indexing, controlling processes (e.g. an industrial robot or autonomous vehicle such as unmanned aerial/ground/see vehicle), detecting events (e.g. for visual surveillance), organizing information (e.g. for indexing databases of images and image sequences), Image based internet search (e.g., searching for similar image on the Internet), modeling objects or environments (e.g. medical image analysis or topographical modeling), interaction (e.g. as the input to a device for computer-human interaction), applications wherein a closed-loop guidance and/or control system is utilized that requires a fast searching algorithm, etc.

Figure 18:
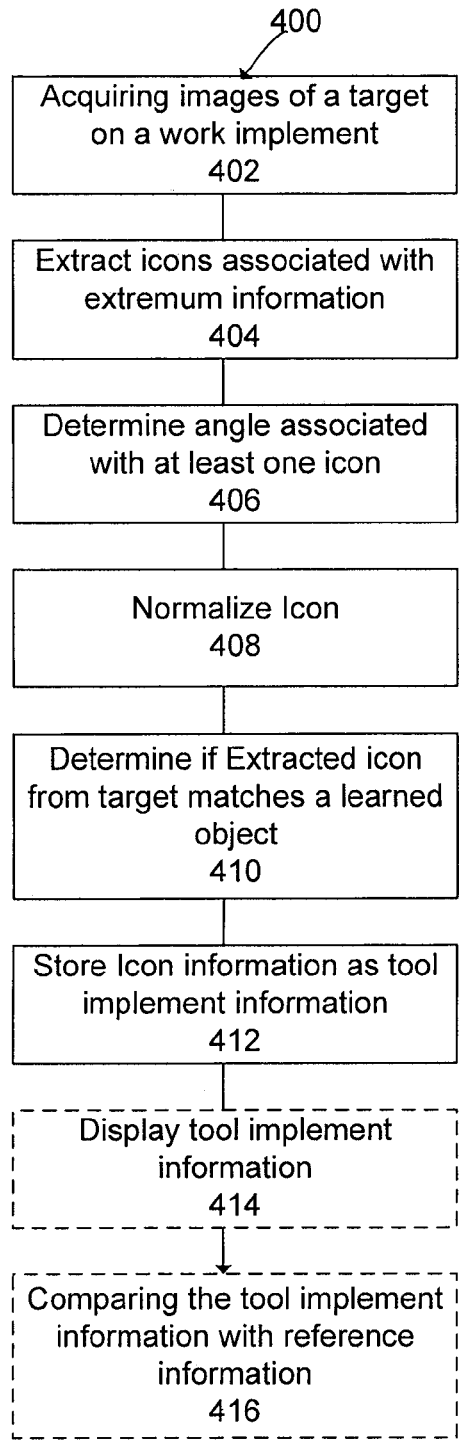
FIGS. 18-19 are flow diagrams of exemplary methods in accordance with aspects of the present invention.

FIG. 18 illustrates an exemplary method of visual tracking of a work implement 14 in accordance with aspects of the present invention. Note: this method assumes that a learned object matching the target has already been learned and is accessible. At block 402, one or more images of work implement 14 having a target 12 positioned in a field of view of one or more cameras are acquired by the one or more cameras. Extremum information associated with the target is generated by cross-correlating at least one structure across at least a portion of the image, wherein the extremum information includes at least one coordinate point associated with cross-correlating the at least one structure across the image. At block 404, at least one icon from the image is extracted, wherein the icon includes a coordinate point associated with the extremum information. At block 406, an angle associated with the at least one icon is determined. At block 408, the icon is normalized to a fixed size. At block 410, a determination is made if the extracted icon from the target matches images a learned object. The step of determining a match may include searching a database of learned objects to determine a match.

At block 412, the icon information is stored as tool implement information in a computer readable form for a plurality of images acquired during performance of the task.

At block 414 the method 400 optionally includes displaying the tool implement information in a graphical user interface on a display to provide feedback regarding at least one of position or rotation of the tool implement during performance of the task.

At block 416, the method 400 optionally includes comparing the tool implement information with reference information to determine if the task was performed satisfactorily. Such reference information may be stored in a database 50, as described above.

Figure 19:
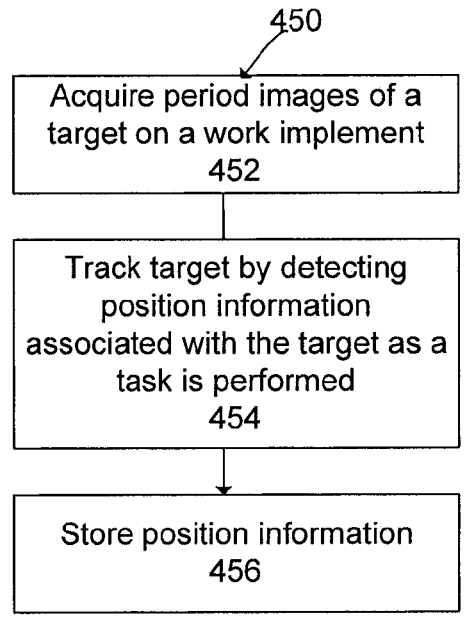

FIG. 19 illustrates another exemplary method 450 for tracking a learned object. At block 452, the method includes acquiring periodic images of a target disposed on a work implement during performance of a task by one or more cameras. At block 454, the target in the images is tracked by detecting position information associated with the target as the task is performed, wherein the position information includes coordinate information and rotation information associated with the target. The position information may be determined by as set forth in blocks 402-410. At block 454, the position information is stored as work implement information in a storage device coupled to the one or more cameras and/or displayed to the user and/or trainer or evaluator, as described above.

The periodic images may be acquired at any desired rate. In one embodiment, images are acquired at 10 images per second. The methods described above are then used to extract icons associated with the images determine if a match exists and find a location and/or position of the target image. As one of ordinary skill in the art will appreciate, the images may be acquired and processed at a faster rate or slower rate depending on the type of application. For example, high speed operations may require a faster rate of acquiring images while low speed operation may fewer images during a particular time interval.

Computer program elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner. The computer program product and any software and hardware described herein form the various means for carrying out the functions of the invention in the example embodiments.

Specific embodiments of an invention are disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". It should also be noted that although the specification lists method steps occurring in a particular order, these steps may be executed in any order, or at the same time.

What is claimed is:

1. A work implement tracking system comprising:
a work implement;
a target secured to the work implement;
at least one camera configured to acquire one or more images of the target; and
a processor coupled to the camera wherein the processor executes a vision recognition algorithm to process the acquired images of the target to determine one or more positions of the work implement during performance of a task and the processor executes a vision tracking algorithm on at least one of the acquired images to determine work implement information, wherein the vision tracking algorithm when executed by the processor
generates extremum information associated with the target by cross-correlating at least one structure across at least a portion of the image, wherein the extremum information includes at least one coordinate point associated with cross-correlating the at least one structure across the acquired image;
extracts at least one icon from the acquired image, wherein the icon includes the coordinate point associated with the extremum information;
determines an angle associated with the at least one icon;
normalizes the icon to a fixed size; and
stores the icon information in a computer readable form, wherein the icon information includes image values associated with at least a portion of the icon; the at least one coordinate point associated with the extremum information; and the angle associated with the at least one icon.

2. The system of claim 1, wherein the work implement is a welding torch.

3. The system of claim 1, wherein the target includes one or more shapes.

4. The system of claim 1, wherein the target includes an infrared source of illumination.

5. The system of claim 1, wherein the camera is a charged coupled device (CCD) camera or a CMOS camera.

6. The system of claim 5, wherein the camera includes a filter coupled to a lens secured to the camera, wherein the filter is an infrared filter.

7. The system of claim 1 further including a data storage device for storing work implement information related to the acquired images.

8. The system of claim 7, wherein the data storage device also stores reference data for comparison against the work implement information to determine whether the task was correctly performed.

9. The system of claim 7, wherein the work implement information includes position information and rotation information of the work implement while the task is performed.

10. The system of claim 1, wherein the vision track algorithm compares the extracted icon with one or more reference icons to determine if the extracted icon matches a learned object.

11. The system of claim 1, further including a display communicatively coupled to the processor to present at least one of work implement information and/or reference data on the display.

12. A computer implemented method of visual tracking of a work implement, the method comprising:
acquiring one or more images of work implement in a view field of one or more cameras to determine one or more positions of the work implement during performance of a task, wherein the one or more images include a target disposed on the work implement;
executing a vision tracking algorithm by a processor, wherein the vision tracking algorithm when executed:
generates extremum information associated with the target by cross-correlating at least one structure across at least a portion of the image, wherein the extremum information includes at least one coordinate point associated with cross-correlating the at least one structure across the image;
extracts at least one icon from the image, wherein the icon includes a coordinate point associated with the extremum information;
determines an angle associated with the at least one icon;

normalizes the icon to a fixed size;

determines if the extracted icon from the target images matches a learned object; and stores the icon information as tool implement information in a computer readable form for a plurality of images acquired during performance of the task.

13. The method of claim 12 further including displaying the tool implement information in a graphical user interface on a display to provide feedback regarding at least one of position or rotation of the tool implement during performance of the task.

14. The method of claim 12 further including comparing the tool implement information with reference information to determine if the task was performed satisfactorily.

15. The method of claim 14, wherein the reference information is stored in a database.

16. The method of claim 12, wherein the step of determining a match includes search a database of learned objects to determine a match.

17. The method of claim 12 further including illuminating the target with an infrared source of electromagnetic radiation.

* * * * *